United States Patent [19]
Hu

[11] Patent Number: 5,825,271
[45] Date of Patent: Oct. 20, 1998

[54] MAGNET ASSEMBLY

[76] Inventor: Yu Kuang Hu, No. 152-1, Chiao Chung Erh St., Pan Chiao City, Taipei Hsien, Taiwan

[21] Appl. No.: 947,154

[22] Filed: Oct. 8, 1997

[51] Int. Cl.⁶ .................................................. H01F 7/20
[52] U.S. Cl. .............................. 335/285; 210/222; 40/600
[58] Field of Search ........................... 335/285; 210/222; 40/600

[56] References Cited

U.S. PATENT DOCUMENTS

| | | | |
|---|---|---|---|
| 3,009,225 | 11/1961 | Budreck | 335/285 |
| 3,153,177 | 10/1964 | McFadyen | 335/285 |
| 5,702,598 | 12/1997 | Lemon et al. | 210/223 |

Primary Examiner—Michael L Gellner
Assistant Examiner—Tuyen T. Nguyen
Attorney, Agent, or Firm—Jacobson, Price, Holman & Stern, PLLC

[57] ABSTRACT

A magnet assembly including a metal cap, a cylindrical body and a magnet. The metal cap is comprised of a concave portion at the top and a convex portion at the bottom. The convex portion may just fit into a slot formed at an upper side of the cylindrical body and be secured therein. A groove is provided at an inner side of the lower portion of the cylindrical body for receiving the magnet such that the magnet may partly project therefrom. The projecting part of the magnet may fit into the concave portion of the metal cap of another magnet assembly. By means of the configuration of the magnet assembly, a plurality of magnet assemblies may be piled up in a neat stack and stuck to a metallic board.

2 Claims, 5 Drawing Sheets

MAGNET ASSEMBLY

BACKGROUND OF THE INVENTION (a) Field of the Invention

The present invention relates generally to a magnet assembly, and more particularly to a magnet assembly of a structure whereby a number of such magnet assemblies may be piled up in a neat stack and stuck to a metallic board.

(b) Description of the Prior Art

FIG. 1 shows a conventional magnet assembly used in office to stick documents or papers to a metallic board. It essentially comprises a shaped plastic base A having a central recess A1 for insertion therein a magnet B. Such a shaped magnet assembly is quite pleasing in appearance and useful in holding papers on the metallic board. However, since the plastic base is insulated, it is not possible to pile up the magnet assemblies on the metallic board, so that there magnet assemblies are randomly arranged on the metallic board, which is not very pleasing and occupies space. Besides, sometimes the magnet assemblies may be hidden from sight by the documents when they are many documents stuck to the board. It is therefore also very inconvenient.

SUMMARY OF THE INVENTION

A primary object of the present invention is to provide a magnet assembly of a structure such that a plurality of magnet assemblies may be piled up in neat stacks to facilitate use. The magnet assembly essentially comprises a metal cap, a cylindrical body, and a magnet. The metal cap is configured to have a concave portion at the top and a convex portion at the bottom. The convex portion may just fit into a slot formed at an upper side of the cylindrical body. A groove is formed in an inner side of the lower portion of the cylindrical body for receiving a magnet such that the magnet may partly project therefrom. The projected part of the magnet may fit into the concave portion of the metal cap of another magnet assembly. In this way, a number of magnet assemblies of the present invention may be piled up in neat stacks on the metallic board.

BRIEF DESCRIPTION OF THE DRAWINGS

The foregoing and other features and advantages of the present inventions will be more clearly understood from the following detailed description and the accompanying drawings, in which.

DETAILED DESCRIPTION OF THE PREFERRED EMBODIMENT

Figure 1:
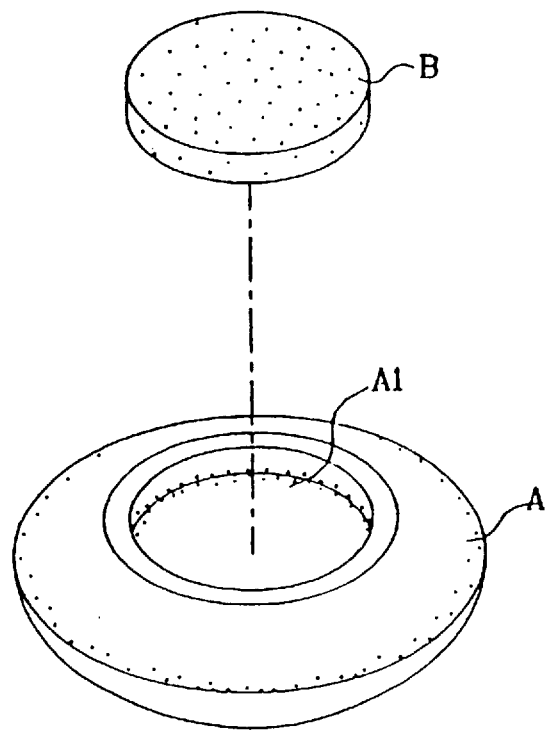
FIG. 1 is an elevational exploded view of the prior art.
Figure 2:
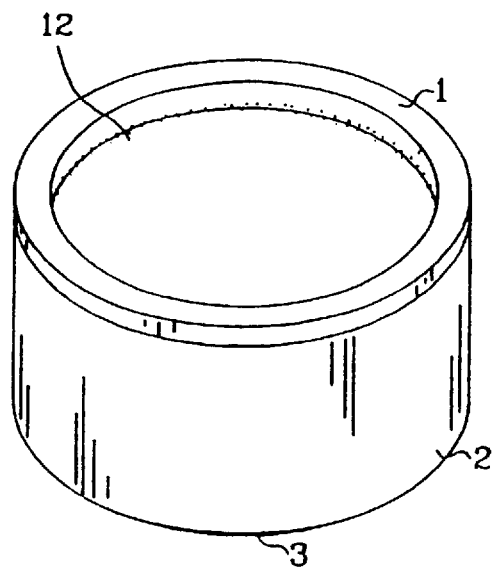
FIG. 2 is an elevational view of the present invention.
Figure 4:
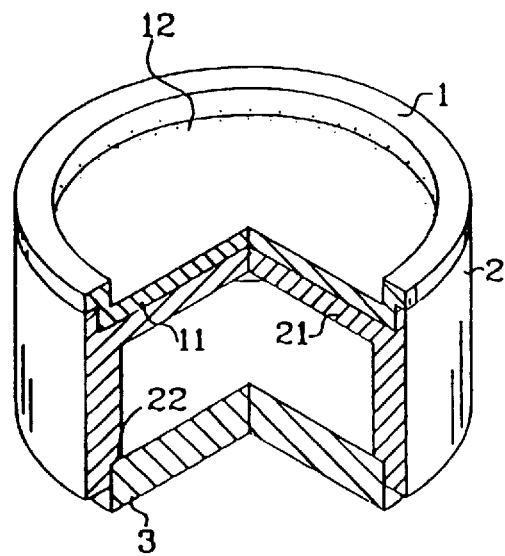
FIG. 4 is an elevational sectional view of the present invention in part.
Figure 3:
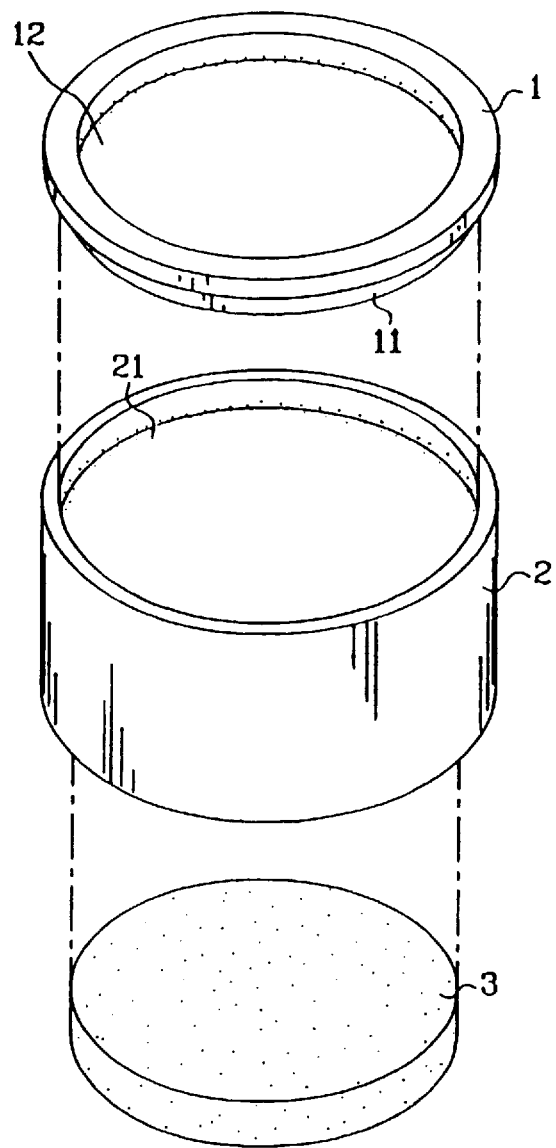
FIG. 3 is an elevational exploded view of the present invention.

With reference to FIGS. 2, 4 and 4, the present invention essentially comprises a metal cap 1, a cylindrical body 2 and a magnet 3. The metal cap 1 is concave at the top and convex at the bottom. The convex portion 11 may just fit into a concave slot 21 at the upper side of the cylindrical body 2 to be secured therein. The cylindrical body 2 is provided with a groove 22 at an inner rim at the lower side thereof for insertion therein to the magnet 3, which may also project therefrom.

Figure 5:
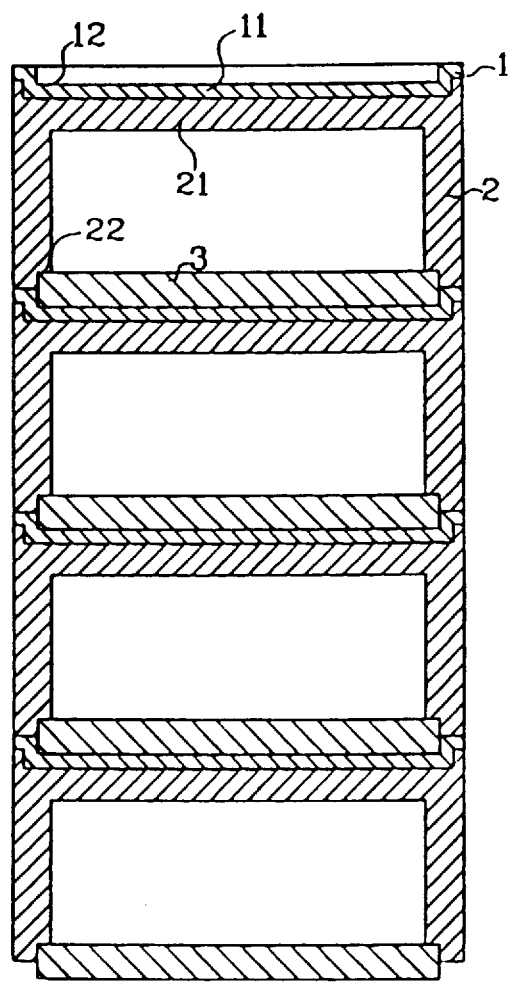
FIG. 5 is an assembled sectional view of the present invention.

As shown in FIG. 5, the concave portion 12 formed at the upper side of the metal cap 1 is also formed of ferrous material and may just secure that part of the magnet 3 projecting from the cylindrical body 2. By configuring the metal cap 1 to have concave and concave portions, a number of magnets may be piled up neatly in a stack.

Figure 6:
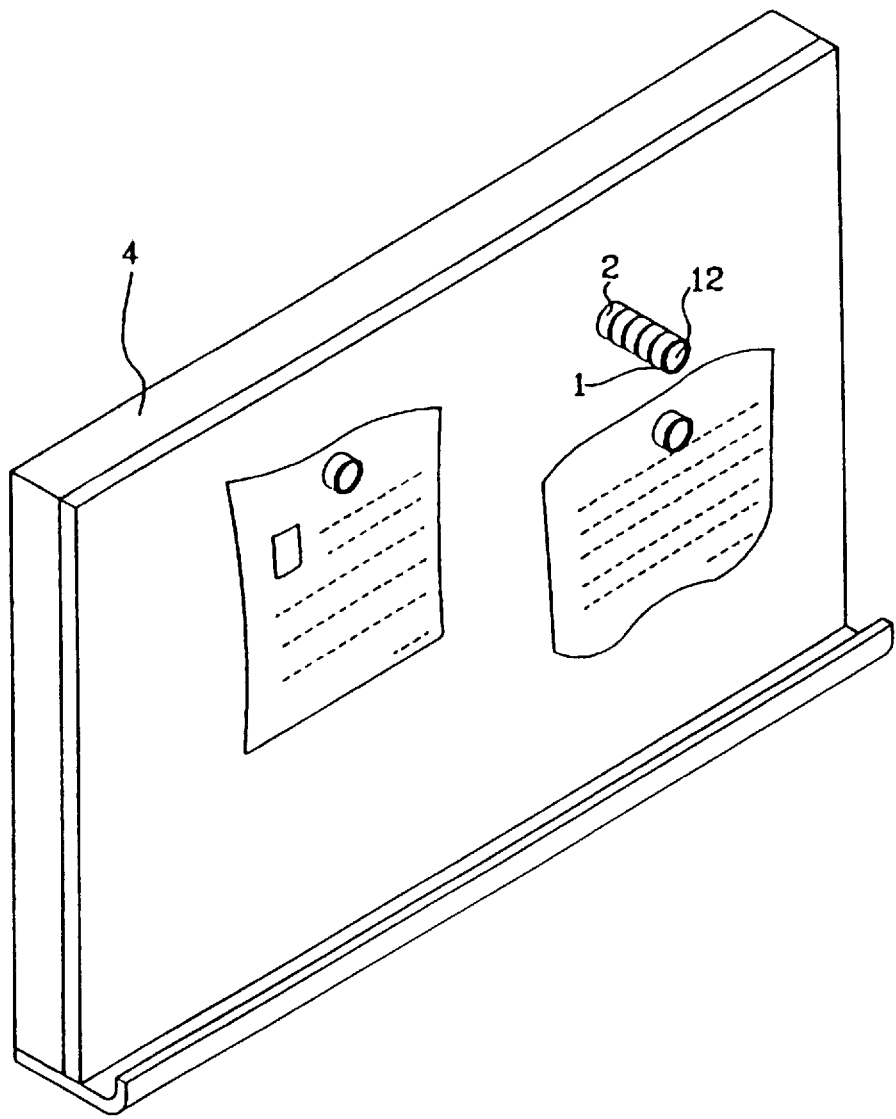
FIG. 6 is a schematic view of the present invention in use.

As shown in FIG. 6, the documents on a magnetic white board 4 may be stuck to the board 4 by means of the portions of the magnets 3 projecting from the bottom sides of the magnet assemblies of the present invention. The concave portion 12 at the upper side is available for receiving another magnet assembly of the present invention. In this way, the magnet assemblies may be arranged in neat stacks, and more magnets may be arranged in this way to facilitate use.

The advantages of the present invention are: simple construction, easy placement and removal, neat arrangement, and space-saving. Besides, the magnet assemblies according to the present invention may be provided with decorative patterns to help beautify the office environment.

Although the present invention has been illustrated and described with reference to the preferred embodiment thereof, it should be understood that it is in no way limited to the details of such embodiment but is capable of numerous modifications within the scope of the appended claims.

What is claimed is:

1. A magnet assembly, comprising a metal cap, a cylindrical body, and a magnet, wherein said metal cap has a concave portion at an upper side and a convex portion at a lower side, said convex portion just fitting into a slot. formed at an upper side of said cylindrical body to be secured therein, said cylindrical body having a groove at an inner side of a lower portion thereof for receiving said magnet, which may partly project therefrom, whereby a plurality of magnet assemblies may be piled up in neat stacks and adhered to a metallic board so as to save space and facilitate use.

2. A magnet assembly as claimed in claim 1, wherein the thickness of said magnet is greater than the depth of said cylindrical body so that, after said magnet is insertably secured in said groove, that part of said magnet projecting from said cylindrical body may fit into the convex portion of the metal cap of another magnet assembly piled thereupon.

\* \* \* \* \*